No. 783,855. PATENTED FEB. 28, 1905.
H. C. CARSON.
DEVICE FOR CHANGING RAILWAY STOCK CARS FROM SINGLE DECK TO DOUBLE DECK AND VICE VERSA.
APPLICATION FILED OCT. 21, 1904.

2 SHEETS—SHEET 1.

WITNESSES:

INVENTOR
Harry C. Carson.
BY Munn & Co
ATTORNEYS

No. 783,855. PATENTED FEB. 28, 1905.
H. C. CARSON.
DEVICE FOR CHANGING RAILWAY STOCK CARS FROM SINGLE DECK
TO DOUBLE DECK AND VICE VERSA.
APPLICATION FILED OCT. 21, 1904.
2 SHEETS—SHEET 2.
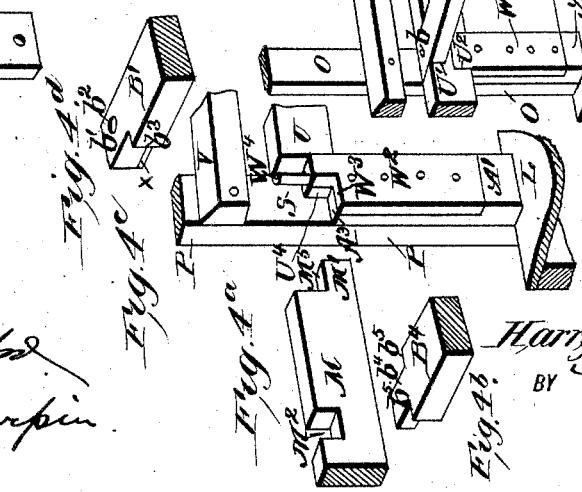
WITNESSES:
INVENTOR
Harry C. Carson
BY Munn & Co.
ATTORNEYS No. 783,855. Patented February 28, 1905.

UNITED STATES PATENT OFFICE.

HARRY CLAY CARSON, OF CHEVIOT, OHIO.

DEVICE FOR CHANGING RAILWAY STOCK-CARS FROM SINGLE DECK TO DOUBLE DECK, AND VICE VERSA.

SPECIFICATION forming part of Letters Patent No. 783,855, dated February 28, 1905.

Application filed October 21, 1904. Serial No. 229,436.

*To all whom it may concern:*

Be it known that I, HARRY CLAY CARSON, a citizen of the United States, residing at Cheviot, in the county of Hamilton and State of Ohio, have made certain new and useful Improvements in Devices for Changing Railway Stock-Cars from Single Deck to Double Deck, and Vice Versa, of which the following is a specification.

My invention is an improvement in stock-cars, being in the nature of devices whereby the stock-car may be readily changed from single deck to double deck, and vice versa; and the invention has for an object to provide improvements in construction of the stock-cars whereby a removable second floor or deck may be employed in a railway stock-car above the ordinary floor and which shall be practical, durable, strong, and cheap and will operate to make the car so constructed safer and stronger with the improved devices than it would be if the same were omitted; and the invention consists in certain novel constructions and combinations of parts, as will be hereinafter described and claimed.

Figure 1:
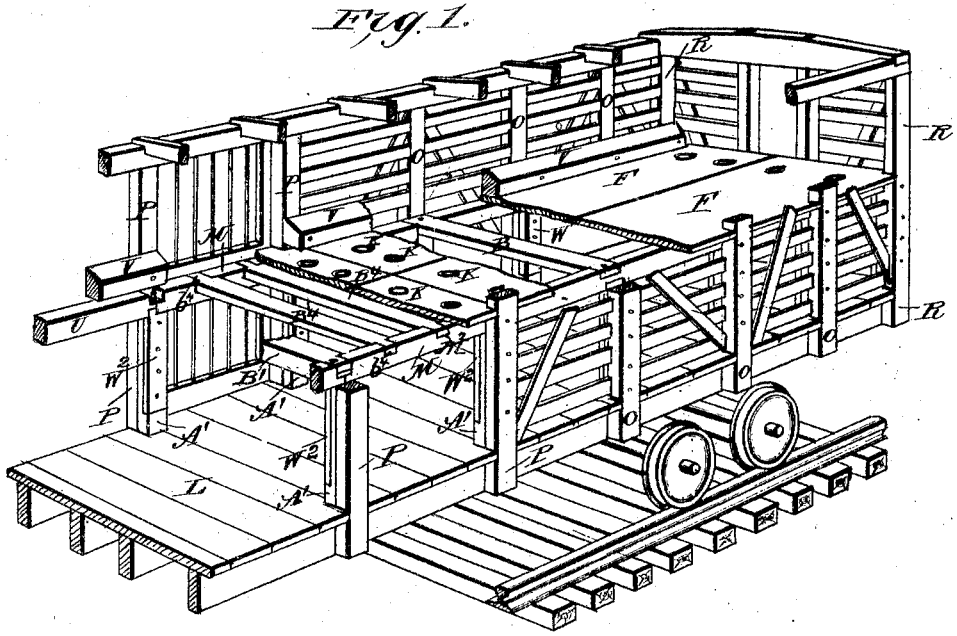
Figure 2:
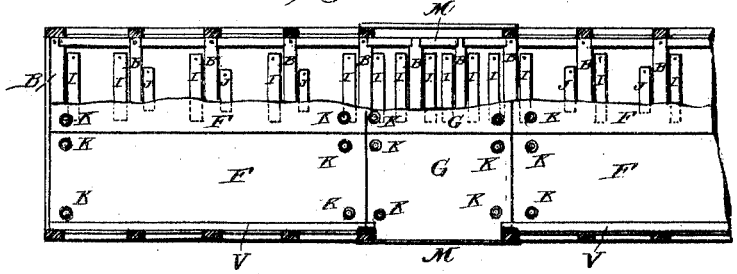
Figure 3:
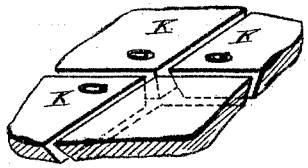

In the drawings, Figure 1 is a perspective view of a portion of a car embodying my invention, parts being broken away and others shown in section. Fig. 2 is a sectional plan view of my improved car, taken above the upper or false floor, portions of the latter being broken away. Fig. 3 is a detail perspective view illustrating the meeting corners of four adjacent deck-sections and showing manner of beveling and overlapping edges. Fig. 4 is a perspective view showing a portion of the framing of the car and illustrating the means for supporting the second floor or deck sections. Fig. $4^a$ is a detail perspective view of one end of one of the side bars for supporting the deck-sections of the doorway portion. Fig. $4^b$ is a detail perspective view of a portion of one of the cross-bars used in the doorway-section of the car. Fig. $4^c$ is a detail perspective view of the inner side of one of the door-posts of the car, showing an upright and stud-plate thereon and the ends of the supporting side bar and of the overlying or keeper side bar. Fig. $4^d$ is a detail perspective view of the end of one of the cross-bars for use at the side of the doorway-section of the car. Fig. $4^e$ shows, assembled, the door-post, its stud-plate, and the parts immediately associated therewith. Fig. 5 is a detail perspective view of a part of one of the side bars for supporting the deck-sections. Fig. 6 is a detail perspective view of the stud-plate to engage with said side bar. Fig. 7 is a detail perspective view of the metal plate for bracing the perforated ends of the cross-bars when the latter are made of wood. Fig. $7^a$ shows in bottom plan and side view one of the cross-bars for use at the side of the doorway-section. Fig. 8 is a sectional view, and Fig. 9 is a top plan view, showing portions of two of the deck-sections.

The present invention relates to that class of devices illustrated by my former patent, No. 652,591, dated June 26, 1900, which presents a removable upper deck for a railway stock-car composed of sections having side supports and center supporting-posts.

My present invention dispenses with the use of the center posts and provides for supporting and bracing the deck-sections securely at the opposite sides of the car and for tying the opposite sides of the car together in such manner as to prevent any spreading of the sides of the car, means being also provided for preventing the deck-sections from being displaced upwardly and at any point throughout their lengths at the opposite sides of said sections.

For convenience of reference the car may be referred to as comprising a doorway-section, which is that portion at the middle adjacent to the doorways at the opposite sides of the car and the main portions of the car between said doorway and the ends of the car, as will be understood from Figs. 1, 2, and 4 of the drawings.

The car may be formed and constructed generally in the well-known or any desired manner and has the main floor L and the posts or stanchions O and P, the latter being the door-posts or those at the opposite sides of the doorway, as shown in Figs. 1, 2, and 4. Side bars U, preferably of oak-wood three inches thick and four inches deep, extend from the ends of the car to flush with the outer sides of the door-posts P. These bars U rest upon and are supported by the inner upright posts A and are provided in their upper edges directly over the upright posts A with mortises or recesses U' six inches wide and two inches deep, which form sockets to receive the ends of the cross-bars B. The beams or bars U, the upright posts A, and the plates W are of such relative thickness that the inner faces of the plates W are flush with the inner faces of the bars U, as best shown in Figs. 4, $4^a$, and $4^c$ of the drawings. Upon the inner face of each upright post A and countersunk therein flush with its surface is secured an iron or steel bar W, which for convenience of reference I call a "stud-plate," such plate being preferably about twelve inches long, two inches wide, and one inch thick and securely riveted or otherwise secured to the false post A and car-stanchions, the upper end of the plate W resting in a recess $U^2$ in the lower edge of the deck-supporting bar U and having at its upper end a stud W', which extends through an opening $U^3$, which extends between the recesses $U^2$ and U', the said stud W' projecting into the recess or socket U' in position to receive the perforated end of the cross-bar B. This cross-bar B, as shown in Figs. 1, 2, and 4, is of uniform width to its ends and is adapted at said ends to fit in the socket U' of the deck-supporting bar U and is perforated at said end at $b$ to receive the stud W', whereby the cross-bars B in the main portion of the car operate to tie the opposite sides of the car together when applied, as shown in Figs. 1, 2, and 4. When these bars B are made of wood, they may be provided at their ends with metal brace-plates, such as shown at X in Fig. 7, such plates being countersunk in the under side of the bars at the ends thereof, as will be understood from Fig. $7^a$, in which the said brace-plates are shown in connection with one of the cross-bars designed for use at the side of the doorway-section; but when the cross-bars B are made of iron such metallic brace-plates will not be necessary.

Keeper-bars V are secured to the inner sides of the stanchions or posts of the car and extend from the ends of the car to the posts at the sides of the doorway-section and are spaced above the deck-supporting bars sufficiently to receive the edges of the deck-sections below them and between them and the supporting-bar U, the said bars V extending from the doorway to the ends of the car and preventing the side edges of the door-sections from being raised and sprung from below in any way by the sudden lurching or roll of the car or from other causes. As best shown in Fig. 2, the deck-sections F are provided on their under sides with cleats I and J, which lap on opposite sides of the cross-bars and lock the same from movement throughout from end to end of the car. It will also be noticed from Figs. 1 and 2 that the deck-sections F are provided with countersunk hand-rings K to facilitate the handling of the said deck-sections in the use of the invention. It will be noticed that the deck-supporting bars U and the keeper-bars, which overlie the said deck-supporting bars, extend from the doorway longitudinally toward the ends of the car, and being secured to and connecting the adjacent stanchions or posts of the car operate to brace the car longitudinally between its ends and the doorway. It will also be noticed that the keeper-bars V overlie the supporting-bars U, extend along and above the upper side of the outer edges of the deck-sections, and such keeper-bars coming flush with the door-posts overlie the deck-sections of the doorway for a distance of about four inches, thus operating to brace such sections, as will be understood from Figs. 1 and 2.

The doorway-section-supporting bars rest upon the uprights or posts W and are provided at their ends with tenons $U^4$, in forming which notches $U^5$ are produced in the upper side of the said bars at their doorway ends. It will be noticed that the inner uprights or posts are secured rigidly to their respective uprights or stanchions O and P, and the stud-plates are countersunk in the inner faces of their respective false uprights.

The stud-plates $W^2$ and their respective uprights A' at the edges of the doorway differ somewhat in construction from the uprights A and the stud-plates W heretofore described. As shown, the stud-plate $W^2$ is provided at its front edge, or its edge facing the doorway, with a notch $W^3$, and the upright A' terminates at its upper end $A^3$ in line with the base-wall of the notch $W^3$, so that the tenon $U^4$ at the doorway end of the deck-supporting bar U may rest in rear of the upper end of the stud-plate $W^2$ and the tenon M' may rest upon the upper end $A^3$ of the upright A' and the base-wall of the notch $W^3$ in the upper end of the stud-plate $W^2$, said bar M resting in the notched upper end of the stud-plate $W^2$ and the tenon $U^4$ of the bar U resting in rear of said stud-plate and upon the upper end of the upright A', the upper side of the bar U being rabbeted or notched at $U^5$ and the upper face of the bar M being rabbeted or notched at $M^5$ to receive the tenon $b'$ at the end of the cross-bar B' at the side of the doorway, said tenon $b'$ being fitted to the stud $W^4$ and the bars U and M, as shown in Figs. 4 and $4^e$, and having the perforation $b^2$ to receive the stud $W^4$ and the shoulder $b^3$ to lap against the inner face of the bar M and hold said bar as against any inward movement. By this construction when the bars B' are fitted to place, as shown in Figs. 4 and $4^e$, the side bar M of the doorway rests upon uprights and stud-plates at opposite sides of the doorway and are held from any inward movement by the shoulder $b^3$ of the cross-bar B'.

The bars M are provided in their upper faces with sockets $M^2$, in which fit the tenons $b^4$ at the ends of the cross-bars $B^4$, which underlie the deck-sections of the doorway-section, shoulders $b^5$ on the cross-bars $B^4$ abutting the inner faces of the bars M and bracing said bars M apart and preventing any displacement of the bars $B^4$ in a longitudinal direction.

It will be understood that in practice the cross-bars B' and $B^4$ may be increased in number, if desired, to any suitable degree without departing from some of the principles of my invention.

The upper removable deck-section when not in use can be easily and quickly removed and stored upon the top of the main car-floor, with the cross-bars, the only loose parts, safely stored between the false deck and the lower or main floor, the entire body of the car being then clear, free, and ready and available at any time or place for any loading, either single or double deck, it not being required to haul the car as an empty double deck or to hold the same because no available loading is at hand.

Having thus described my invention, what I claim as new, and desire to secure by Letters Patent, is—

1. The combination in an apparatus substantially as described of the stanchions or posts including the door-posts, the upper deck-sections, and supporting-bars for said deck-sections extending from the ends of the car to the doorway and provided in their upper edges with sockets for the cross-bars and in their lower edges with notches for the upper ends of the stud-plates and provided at their ends with tenons to rest in rear of the stud-plates at the doorway, the uprights or posts resting beneath the supporting-bars, the stud-plates on said uprights, the stud-plates at the doorway being notched in their upper edges, the upwardly-projecting studs at the upper ends of the stud-plates, the side bars crossing the doorways and notched in their upper edges for their cross-bars and rabbeted in their upper edges at their ends, the cross-bars extending from side to side of the car and perforated near their ends to receive the studs of their respective stud-plates, and the keeper-bars extending from the ends of the car to the doorway and overlying the outer edges of the upper deck-sections all substantially as and for the purpose set forth.

2. The combination in a car substantially as described of the deck-sections, the horizontally-extending supporting-bars for said sections extending from the doorway to the end of the car, uprights upon which said supporting-bars rest, the supporting-bars being provided in their upper sides with sockets for the cross-bars, said sockets being directly above the uprights and the cross-bars resting at their ends in the sockets of the supporting-bars substantially as set forth.

3. The combination in a stock-car with the deck-sections and the horizontally-extending bars for supporting the same, of the stud-plates provided at their upper ends with upwardly-projecting studs extending through the supporting-bar and the cross-bars having at their ends perforations receiving the said studs, substantially as set forth.

4. The combination in a stock-car, of the studs at the opposite sides thereof, the deck-sections, and the cross-bars provided at their ends with brace-plates having perforations receiving the opposite studs substantially as set forth.

5. The combination in a stock-car with the deck-sections, of the supporting-bars underlying the said sections at their outer edges and the keeper-bars extending longitudinally above the said supporting-bars and overlying the outer edges of the deck-sections substantially as set forth.

6. The combination in a stock-car with the door-posts, of the stud-plates having the studs $W^4$ and the notches $W^3$, the deck-supporting bars extending from said door-posts toward the ends of the car and provided at their doorway ends with tenons fitting behind the upper ends of the stud-plates, the doorway-supporting bars extending between the door-posts at the same side of the car and provided at their ends with tenons M', and the cross-bars B' perforated at their ends to fit over the studs of the stud-plates and having shoulders $b^3$ abutting the side bars M and the cross-bars extending between the side bars M substantially as and for the purpose set forth.

7. The combination in a stock-car, of the framing, the door-posts, the deck-supporting bars extending between the door-posts and the ends of the car and socketed at U' for cross-bars, the cross-bars fitting at their ends in said sockets, the keeper-bars extending from the ends of the car above the deck-supporting bars and projecting at their ends across the door-posts whereby to overlie at said ends the deck-sections of the doorway portion of the car, the side bars M crossing the doorways and the cross-bars between said side bars M, substantially as set forth.

HARRY CLAY CARSON.

Witnesses:
    HUNTLEY H. WHENY,
    M. L. DODEZ.